(12) United States Patent
Donegan et al.

(10) Patent No.: US 12,449,615 B2
(45) Date of Patent: Oct. 21, 2025

(54) CALIBRATION MARKERS FOR A PHOTONICS CHIP

(71) Applicant: GlobalFoundries U.S. Inc., Malta, NY (US)

(72) Inventors: Keith Donegan, Saratoga Springs, NY (US); Takako Hirokawa, Ballston Lake, NY (US); Yusheng Bian, Ballston Lake, NY (US); Thomas Houghton, Marlboro, NY (US); Kevin Dezfulian, Arlington, VA (US); Carrie Yurkon, Saratoga Springs, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 265 days.

(21) Appl. No.: 18/212,754

(22) Filed: Jun. 22, 2023

(65) Prior Publication Data

US 2024/0427094 A1 Dec. 26, 2024

(51) Int. Cl.
*G02B 6/42* (2006.01)
*G06T 7/00* (2017.01)

(52) U.S. Cl.
CPC ......... *G02B 6/4256* (2013.01); *G02B 6/4214* (2013.01); *G02B 6/4296* (2013.01); *G06T 7/0004* (2013.01); *G06T 2207/30204* (2013.01)

(58) Field of Classification Search
CPC ... G02B 6/4221; G02B 6/4222; G02B 6/4224
See application file for complete search history.

(56) References Cited

U.S. PATENT DOCUMENTS

2023/0305244 A1* 9/2023 Shastri ................ H01L 25/167

OTHER PUBLICATIONS

S. Bernabéet al., "In-plane pigtailing of silicon photonics device using "semi-passive" strategies," 2012 4th Electronic System-Integration Technology Conference, Amsterdam, Netherlands, 2012, pp. 1-6, doi: 10.1109/ESTC.2012.6542171.

Mu, Xin, Sailong Wu, Lirong Cheng, and H.Y. Fu. 2020. "Edge Couplers in Silicon Photonic Integrated Circuits: A Review" Applied Sciences 10, No. 4: 1538. https://doi.org/10.3390/app10041538.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

(Continued)

*Primary Examiner* — Chad H Smith
(74) *Attorney, Agent, or Firm* — Thompson Hine LLP; Anthony Canale

(57) ABSTRACT

Structures including a calibration marker adjacent to a photonic structure and methods of forming such structures. The structure comprises a semiconductor substrate, a photonic structure, and a back-end-of-line stack over the semiconductor substrate. The back-end-of-line stack includes a plurality of fill features, an exclusion area surrounded by the plurality of fill features, and a calibration marker in the exclusion area. The calibration marker is disposed adjacent to the photonic structure, and the calibration marker includes a feature having a predetermined dimension.

20 Claims, 12 Drawing Sheets

(56) References Cited

OTHER PUBLICATIONS

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3l.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

Donegan, Keith et al., "Reference Markers Adjacent To a Cavity in a Photonics Chip" filed on Apr. 25, 2023 as a U.S. Appl. No. 18/139,128.

* cited by examiner

US 12,449,615 B2

CALIBRATION MARKERS FOR A PHOTONICS CHIP

BACKGROUND

The disclosure relates to photonics chips and, more specifically, to structures including a calibration marker adjacent to a photonic structure and methods of forming such structures.

Photonics chips are used in many applications and systems including, but not limited to, data communication systems and data computation systems. A photonics chip includes a photonic integrated circuit comprised of photonic structures, such as modulators, polarizers, and optical couplers, that are used to manipulate light received from a light source, such as a laser or an optical fiber.

An external light source, such as a laser or an optical fiber, may be attached to a photonics chip. An edge coupler couples light of a given mode from the light source to the photonic integrated circuit. The light source may be disposed inside a cavity formed in the substrate of the photonics chip and attached to a surface of the cavity. The edge coupler may include a waveguide core that defines an inverse taper having a tip that is positioned adjacent to an edge of the cavity. The gradually-varying cross-sectional area of the inverse taper supports mode transformation and mode size variation associated with mode conversion when light is transferred by the edge coupler from the light source to the photonic integrated circuit.

A metrology tool may be used to acquire an image of a photonic structure and then to measure one or more dimensions of the photonic structure from the image. In particular, the width dimension of the cavity adjacent to the edge coupler may be measured by the metrology tool. The measurement accuracy is contingent upon the quality of the calibration of the metrology tool.

Improved structures including a calibration marker adjacent to a photonic structure and methods of forming such structures are needed.

SUMMARY

In an embodiment of the invention, a structure comprises a semiconductor substrate, a photonic structure, and a back-end-of-line stack over the semiconductor substrate. The back-end-of-line stack includes a plurality of fill features, an exclusion area surrounded by the plurality of fill features, and a calibration marker in the exclusion area. The calibration marker is disposed adjacent to the photonic structure, and the calibration marker includes a feature having a predetermined dimension.

In an embodiment, a method of calibrating a metrology tool is provided. The method comprises acquiring an image of a calibration marker and a photonic structure adjacent to the calibration marker using the metrology tool. The calibration marker includes a feature having a predetermined dimension. The method further comprises determining a first number of pixels for a dimension of the feature in the image, determining a calibration factor equal to the predetermined dimension divided by the first number of pixels, determining a second number of pixels for a dimension of the photonic structure in the image, and converting the second number of pixels to a linear dimension using the calibration factor In an embodiment of the invention, a method comprises forming a back-end-of-line stack over a semiconductor substrate. The back-end-of-line stack includes a plurality of fill features, an exclusion area surrounded by the plurality of fill features, and a calibration marker in the exclusion area. The calibration marker is adjacent to a photonic structure, and the calibration marker includes a feature having a predetermined dimension.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
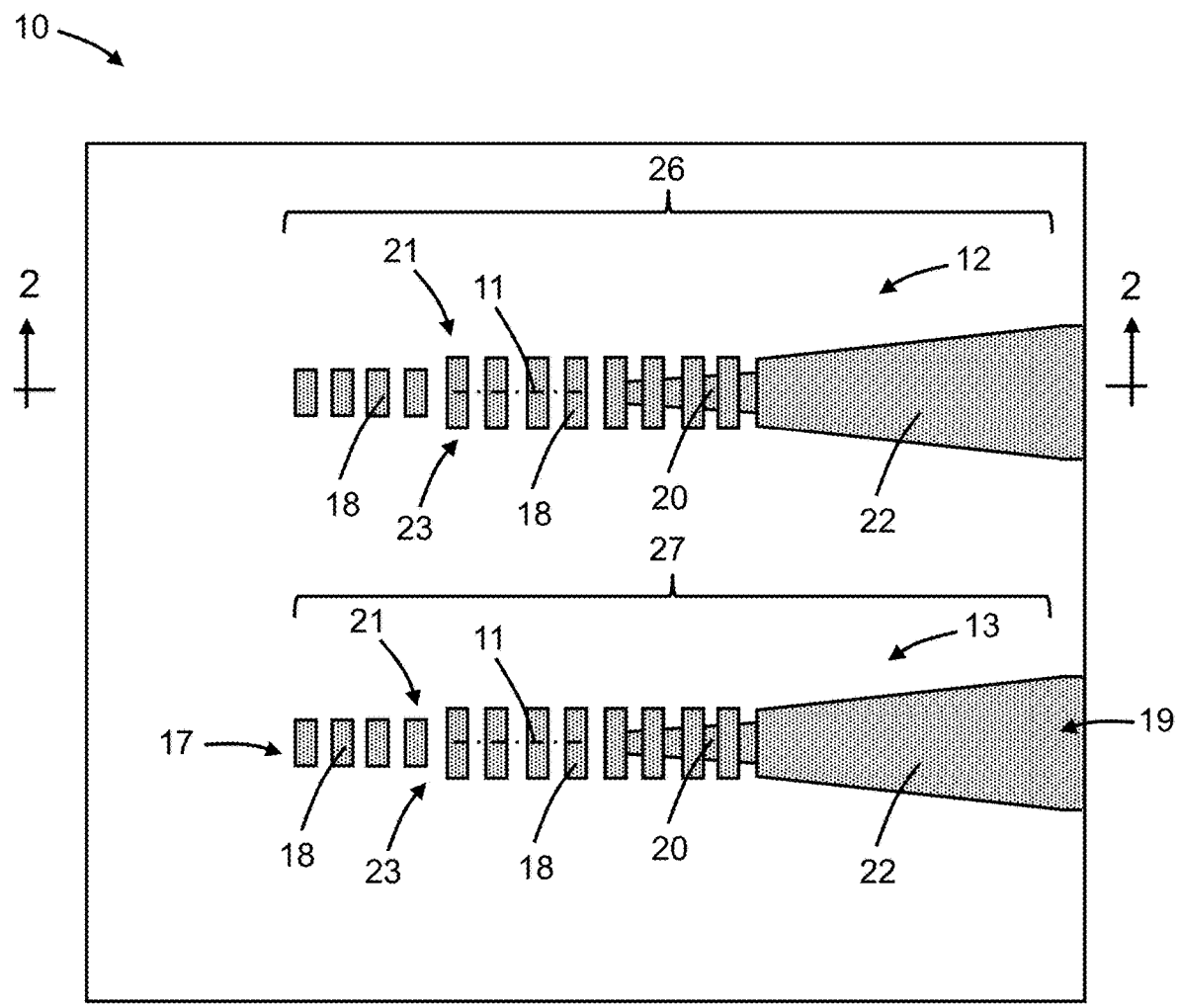
FIG. 1 is a top view of a structure at an initial fabrication stage of a processing method in accordance with embodiments of the invention.
Figure 2:
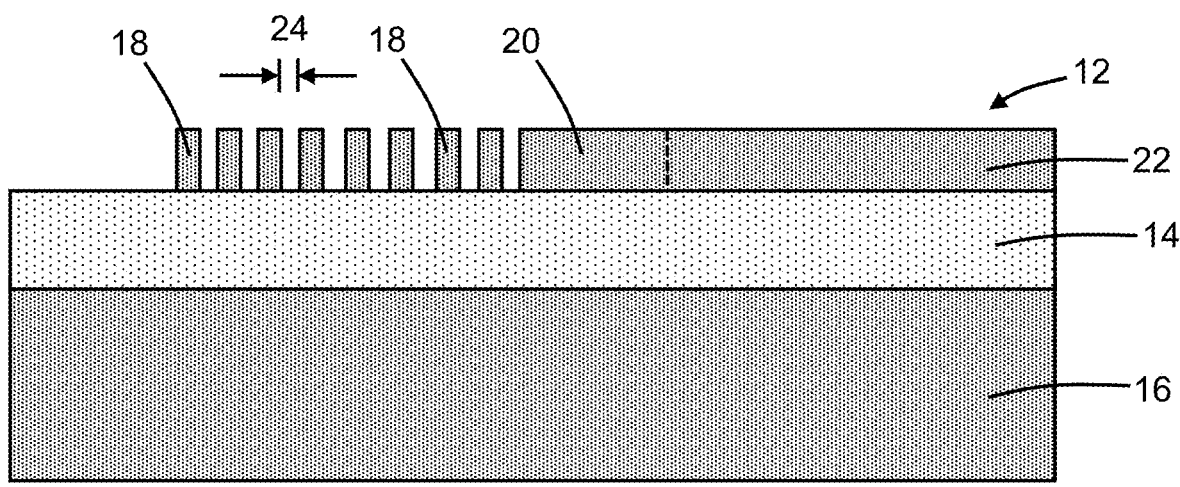
FIG. 2 is a cross-sectional view taken generally along line 2-2 in FIG. 1.
Figure 3:
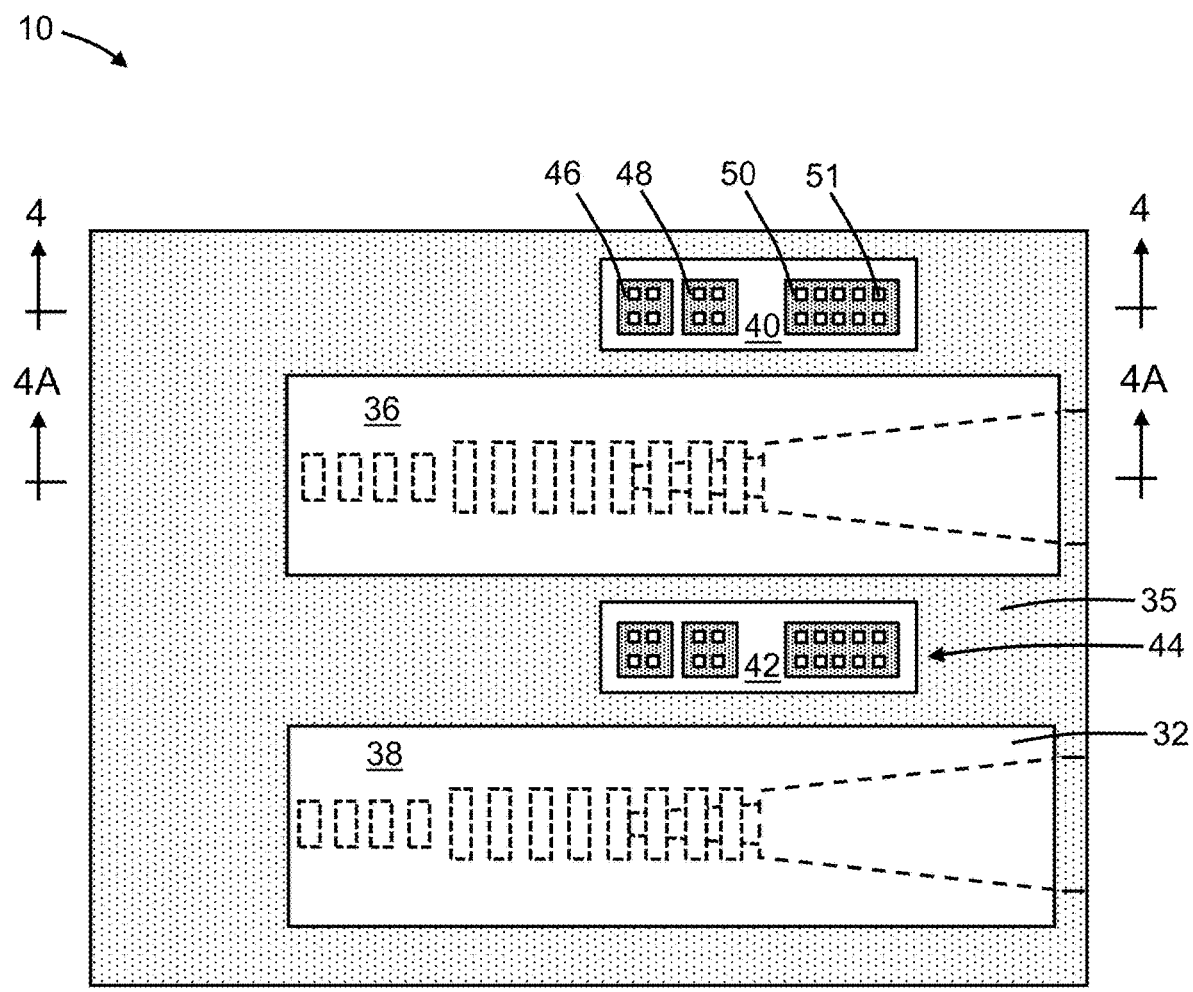
FIG. 3 is a top view of the structure at a fabrication stage of the processing method subsequent to FIGS. 1, 2.
Figure 3A:
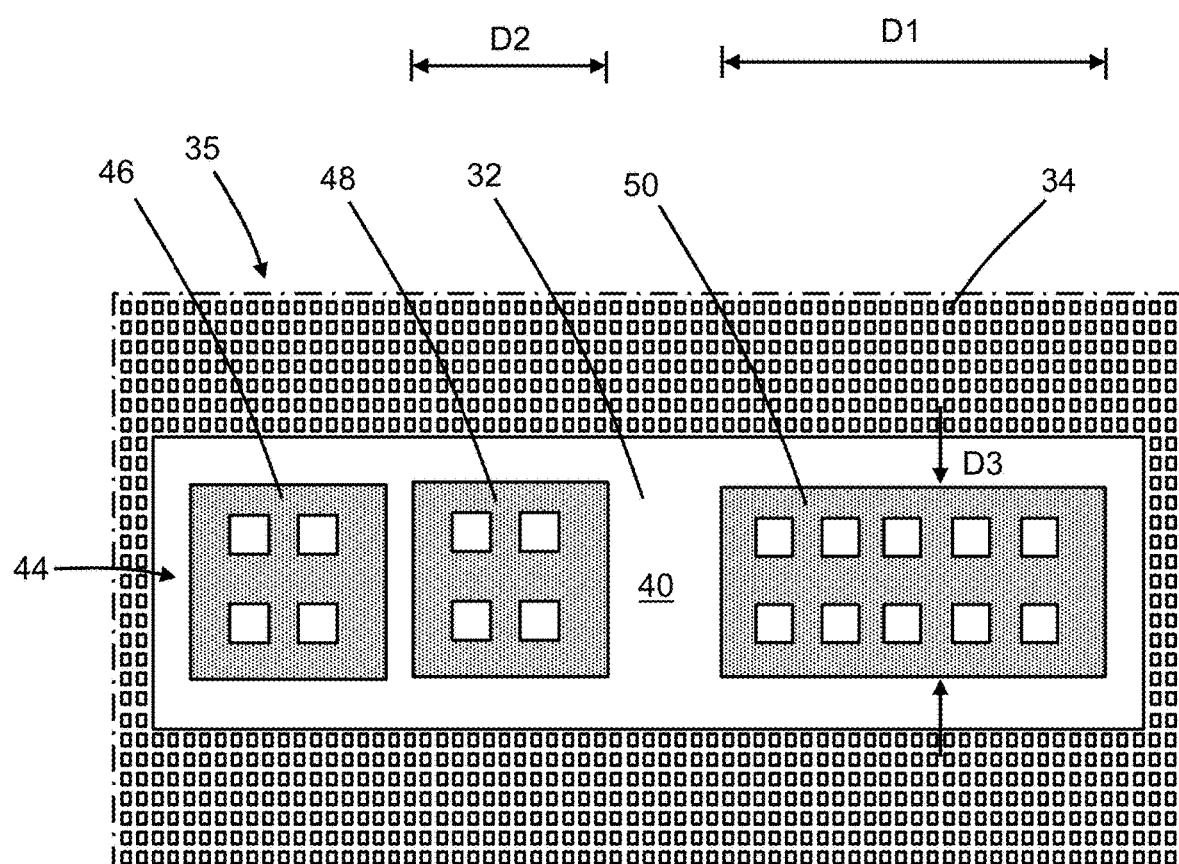
FIG. 3A is an enlarged view of a portion of FIG. 3.
Figure 4:
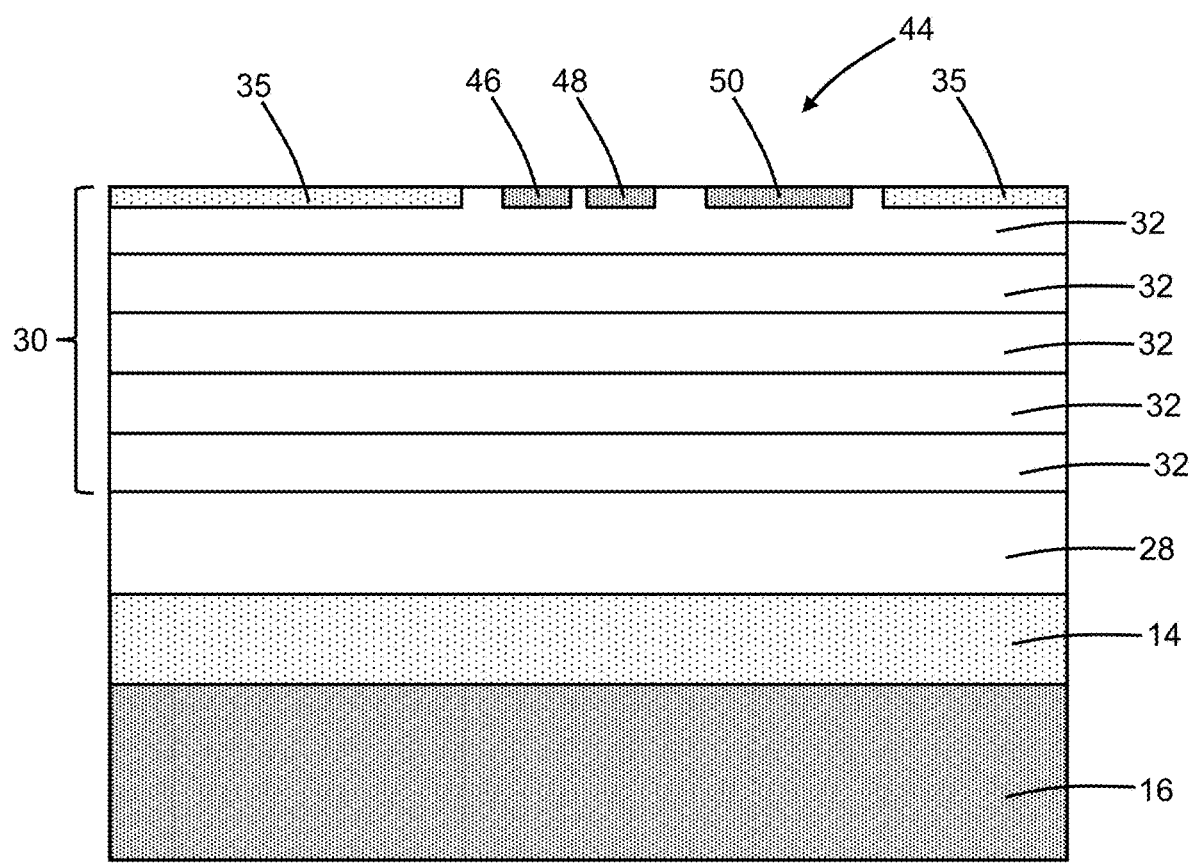
FIG. 4 is a cross-sectional view taken generally along line 4-4 in FIG. 3.
Figure 4A:
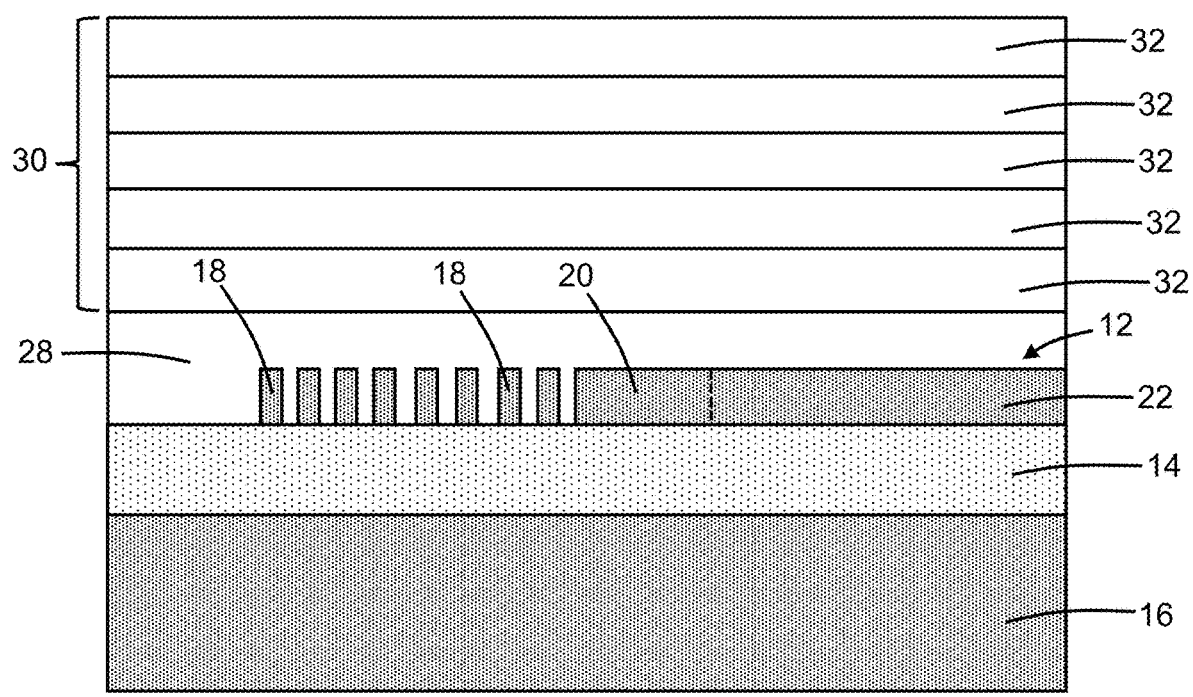
FIG. 4A is a cross-sectional view taken generally along line 4A-4A in FIG. 3.

With reference to FIGS. 1, 2 and in accordance with embodiments of the invention, a structure 10 includes a waveguide core 12 and a waveguide core 13 that are positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate, and the dielectric layer 14 may fully separate the waveguide core 12 from the semiconductor substrate 16. The waveguide cores 12, 13 are separated from the semiconductor substrate 16 by the dielectric material of the intervening dielectric layer 14, which operates as lower cladding. The dielectric layer 14 adjoins the semiconductor substrate 16 along an interface, and the dielectric layer 14 has an upper surface on which the waveguide cores 12, 13 are positioned. In an alternative embodiment, one or more additional dielectric layers comprised of, for example, silicon dioxide may be positioned between the waveguide cores 12, 13 and the dielectric layer 14.

In an embodiment, the waveguide cores 12, 13 may be comprised of a material having a refractive index that is greater than the refractive index of silicon dioxide. In an embodiment, the waveguide cores 12, 13 may be comprised of a semiconductor material, such as single-crystal silicon, amorphous silicon, or polysilicon. In an alternative embodiment, the waveguide cores 12, 13 may be comprised of a dielectric material, such as silicon nitride, silicon oxynitride, or aluminum nitride.

In an embodiment, the waveguide cores 12, 13 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide cores 12, 13. In an embodiment, the waveguide cores 12, 13 may be formed by patterning the semiconductor material (e.g., single-crystal silicon) of the device layer of a silicon-on-insulator substrate. In an embodiment, the waveguide cores 12, 13 may be formed by patterning a deposited layer comprised of their material (e.g., silicon nitride).

Each of the waveguide cores 12, 13 may include segments 18, a rib 20 that overlaps with some of the segments 18, and a section 22 that is positioned adjacent to the segments 18 and rib 20. The segments 18, rib 20, and section 22 may be arranged along a longitudinal axis 11. In an embodiment, each of the waveguide cores 12, 13 may have an end 17 that is terminated by one of the segments 18, an end 19 opposite from the end 17 and terminated by the section 22, and opposite sides 21, 23. In an embodiment, the section 22 may be an inverse taper that widens with decreasing distance from the end 19. Adjacent pairs of the segments 18 are separated by gaps having a given dimension in a direction parallel to the longitudinal axis 11. The segments 18 may be dimensioned and positioned at small enough pitch so as to define a sub-wavelength grating that does not radiate or reflect light at a wavelength of operation, such as a wavelength in a range of 400 nm to 3000 nm.

The segments 18, rib 20, and section 22 of the waveguide core 12 may define an edge coupler 26, and the segments 18, rib 20, and section 22 of the waveguide core 13 may define an edge coupler 27 that is distinct from the edge coupler 26. The section 22 of each of the waveguide cores 12, 13 may be connected to a photonic integrated circuit of the photonics chip such that light is transferred from the edge couplers 26, 27 to the photonic integrated circuit. The waveguide cores 12, 13 and, in particular, the edge couplers 26, 27 define photonic structures of the photonics chip.

In alternative embodiments, the edge couplers 26, 27 may have a different configuration. For example, the segments 18 and rib 20 may be replaced by a solid inverse taper characterized by one or more taper angles. As another example, the waveguide cores 12, 13 may be modified to include multiple tips.

With reference to FIGS. 3, 3A, 4, 4A in which like reference numerals refer to like features in FIGS. 1, 2, 2A and at a subsequent fabrication stage, a dielectric layer 28 may be formed over the waveguide cores 12, 13. The dielectric layer 28 may be comprised of a dielectric material, such as silicon dioxide, having a refractive index that is less than the refractive index of the material constituting the waveguide cores 12, 13. The dielectric layer 28 may be deposited and planarized following deposition.

A back-end-of-line stack 30 including stacked interlayer dielectric layers 32 is formed over the dielectric layer 28. Each interlayer dielectric layer 32 of the back-end-of-line stack 30 may be comprised of a dielectric material, such as silicon dioxide, silicon nitride, tetraethylorthosilicate silicon dioxide, or fluorinated-tetraethylorthosilicate silicon dioxide.

Fill features 34 may be formed in an associated interlayer dielectric layer 32 to define a fill region 35. The fill features 34 in the fill region 35 define tiles or fill cells that occupy a fraction of the surface area of the associated interlayer dielectric layer 32. The fill features 34 may be absent in exclusion areas 36, 38 that respectively overlap with the edge couplers 26, 27, as well as absent from an exclusion area 40 that is laterally spaced from the exclusion area 36 including the edge coupler 26 and absent from an exclusion area 42 that is laterally spaced from the exclusion area 38 including the edge coupler 27. In an embodiment, the exclusion areas 36, 38 and the exclusion areas 40, 42 may be fully surrounded by the fill features 34.

In an embodiment, the fill features 34 may be comprised of a metal. In an embodiment, the fill features 34 may be comprised of copper. In an alternative embodiment, the fill features 34 may be comprised of aluminum. The fill features 34 may be polygonal (e.g., square or rectangular), round, elliptical, or a combination of these shapes, and may be formed as a pattern of printed shapes by lithography and etching processes. The fill features 34 may, for example, assist with the formation of other metal features (not shown) in the associated interlayer dielectric layer 32 by, for example, limiting dishing during polishing.

Calibration markers 44 may be formed in each of the exclusion areas 40, 42 from which the fill features 34 are missing or absent. In an embodiment, each calibration marker 44 include a set of features 46, 48, 50 that are surrounded by a perimeter of the area enclosed by the exclusion area 40 or the exclusion area 42. In an embodiment, the features 46, 48, 50 may be arranged in a row, and the feature 48 may be disposed in the row between the feature 46 and the feature 50. The features 46, 48, 50 of each calibration marker 44 are not electrically connected by the back-end-of-line stack 30 to any circuit and, therefore, are non-functional and inactive. The calibration markers 44 are disposed in portions of the fill region 35 that do not impact the functioning of the edge couplers 26, 27.

In an embodiment, the feature 50 may be larger than the features 46, 48 and the features 46, 48 may be equally sized. The features 46, 48, 50 may having predetermined dimensions (e.g., length and width) that may be measured in units of, for example, microns. For example, the feature 50 may have a predetermined dimension D1 as a length, the features 46, 48 may have a predetermined dimension D2 as a length, and all of the features 46, 48, 50 may have a predetermined dimension D3 as a width. The predetermined dimensions of the features 46, 48, 50 may be established when the features 46, 48, 50 are patterned.

The calibration markers 44 may be patterned when the fill features 34 are formed, and the calibration markers 44 may be comprised of the same metal as the fill features 34. In an embodiment, the different calibration markers 44 may be identical. In an embodiment, the different calibration markers 44 may be substantially identical. In an embodiment, the features 46, 48, 50 may be solid metal that is cheesed with internal openings 51 defining voids. The incorporation of the internal openings 51 may maintain compatibility with ground rules associated with the formation of the fill features 34. In an embodiment, the internal openings 51 may be fully surrounded by metal. In an embodiment, the internal openings 51 may be arranged in an array of rows and columns.

The calibration marker 44 in the exclusion area 40 is disposed adjacent to the exclusion area 36 and the edge coupler 26 overlapped by the exclusion area 36. The calibration marker 44 in the exclusion area 42 is disposed adjacent to the exclusion area 38 and the edge coupler 27 overlapped by the exclusion area 38. The edge coupler 26 and the exclusion area 36 are positioned in a lateral direction between the calibration marker 44 in the exclusion area 40 and the calibration marker 44 in the exclusion area 42. In an embodiment, the edge coupler 26 may be symmetrically positioned between the calibration marker 44 in the exclusion area 40 and the calibration marker 44 in the exclusion area 42. The side 21 of the edge coupler 26 is disposed adjacent to the calibration marker 44 in the exclusion area 40, the side 23 of the edge coupler 26 is disposed adjacent to the calibration marker 44 in the exclusion area 42, and the side 21 of the edge coupler 27 is disposed adjacent to the calibration marker 44 in the exclusion area 42.

In an embodiment, the features 46, 48, 50 may have an outer perimeter that is polygonal (e.g., squares or rectangular), round, elliptical, or a combination of these geometrical shapes. In an embodiment, each of the features 46, 48, 50 may be a rectangular polygon.

Figure 5:
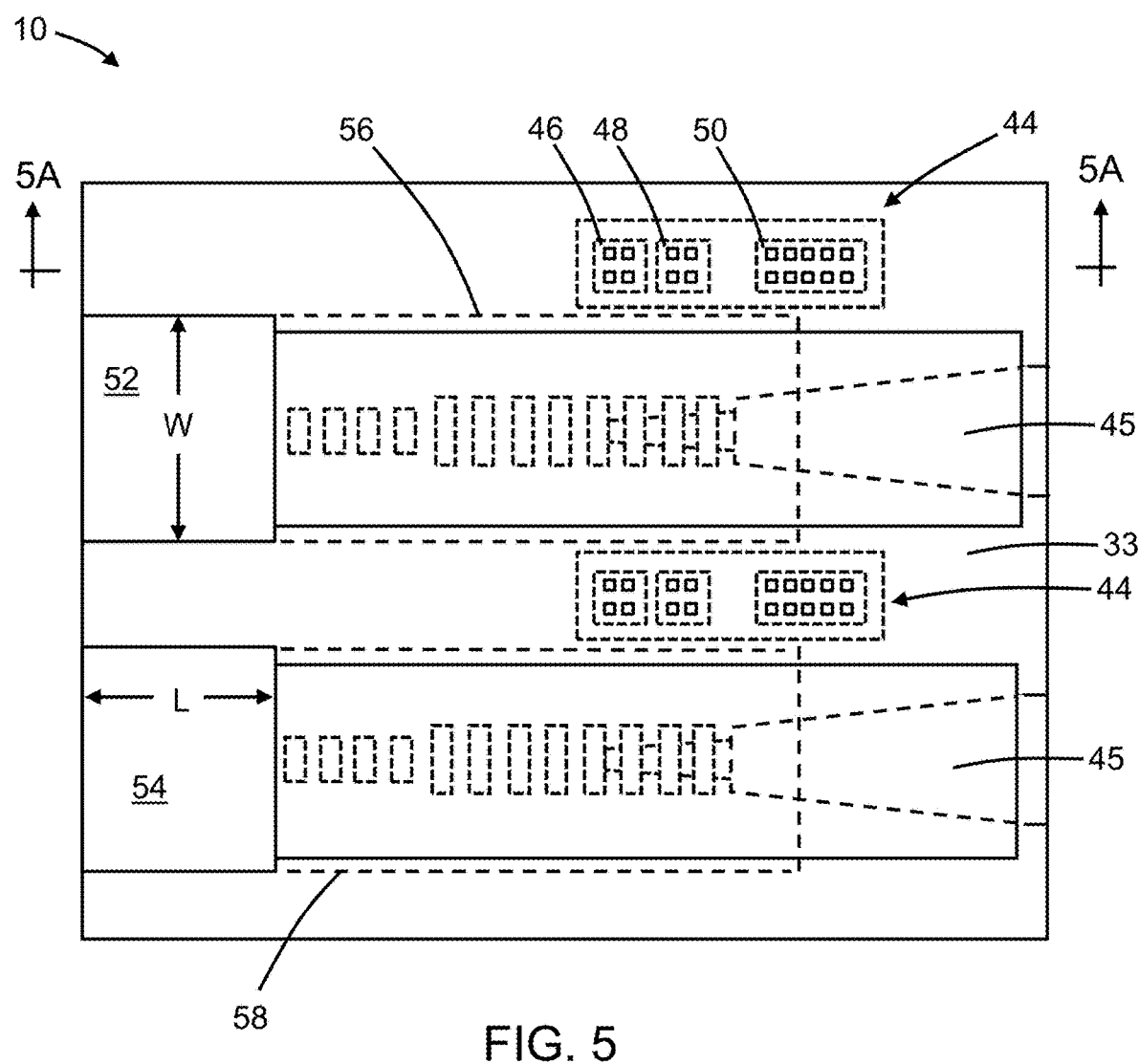
FIG. 5 is a top view of the structure at a fabrication stage of the processing method subsequent to FIGS. 3, 4.
Figure 5A:
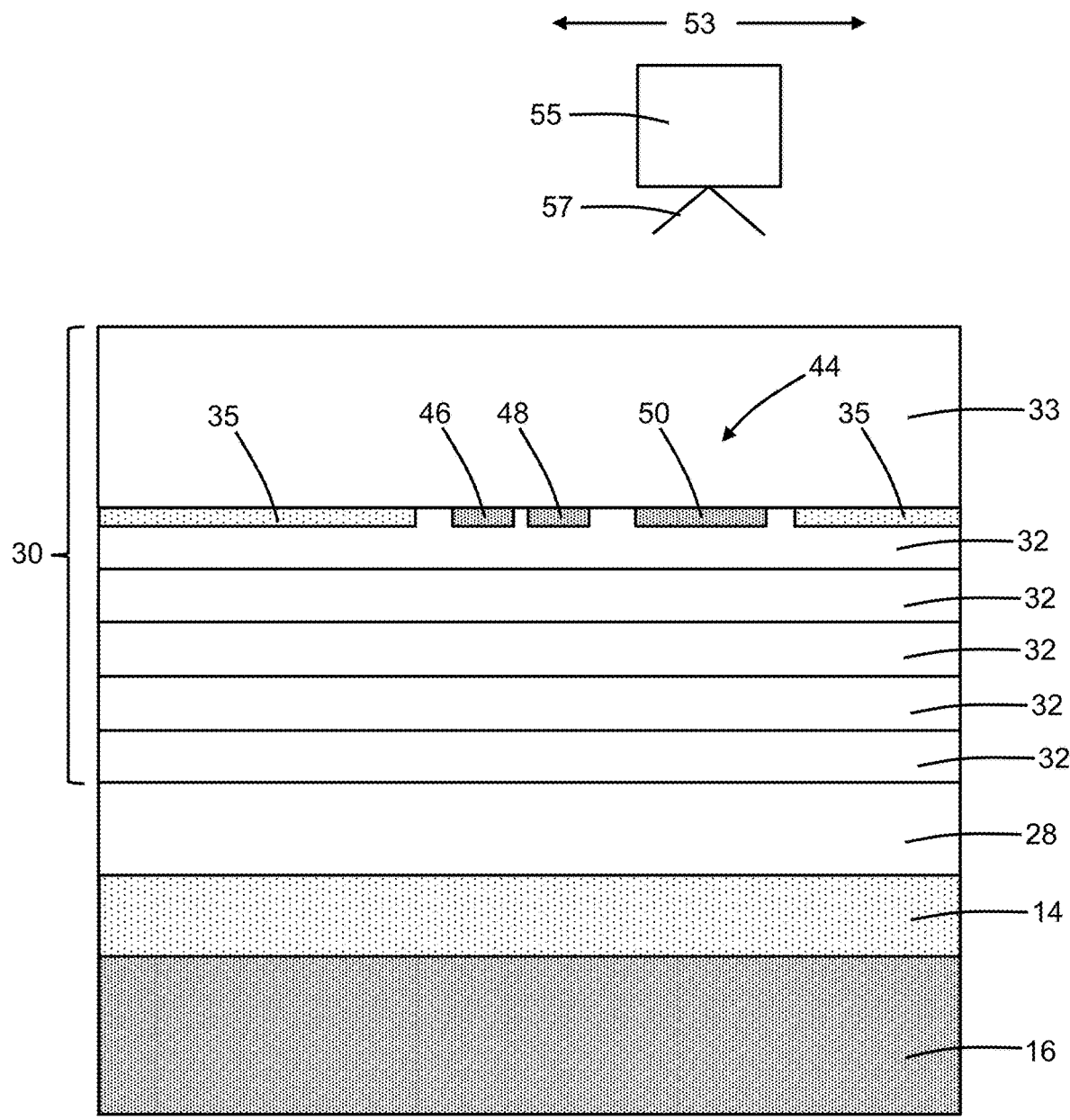
FIG. 5A is a cross-sectional view taken generally along line 5A-5A in FIG. 5.

With reference to FIGS. 5, 5A in which like reference numerals refer to like features in FIGS. 3, 3A, 4, 4A and at a subsequent fabrication stage, one or more additional interlayer dielectric layers 33 of the back-end-of-line stack 30 may be formed over the calibration markers 44. Respective portions of the back-end-of-line stack 30 proximate to the edge couplers 26, 27 may be removed, and replaced by dielectric layers 45. The dielectric layers 45 may be comprised of a homogeneous dielectric material, such as silicon dioxide.

Cavities 52, 54 are defined as photonic structures in the semiconductor substrate 16. The cavity 52 may adjoin an undercut region 56 that extends beneath the dielectric layer 14 such that a portion of the edge coupler 26 is suspended over the undercut region 56. The cavity 54 may adjoin an undercut region 58 that extends beneath the dielectric layer 14 such that a portion of the edge coupler 27 is suspended over the undercut region 58. Portions of the dielectric layer 14 define membranes between the suspended portions of the edge couplers 26, 27 and the undercut regions 56, 58. In an embodiment, the cavities 52, 54 may have open ends spaced from the ends 17 of the edge couplers 26, 27 to define grooves. Additional sets of cavities and calibration markers (not shown) may be added to the structure 10.

The cavities 52, 54 may be formed by a multiple-step process. Lithography and etching processes may be used to form openings that extend through the back-end-of-line stack 30 and into the semiconductor substrate 16, and to also form holes (not shown) extending through the dielectric layers of the back-end-of-line stack 30, the dielectric layer 45, and the dielectric layer 14 into the semiconductor substrate 16 on opposite sides of the edge couplers 26, 27. The openings in the semiconductor substrate 16 may then be masked with a resist, and the semiconductor substrate 16 beneath respective portions of the edge couplers 26, 27 may be etched through the holes by an etching process using, for example, a sulfur hexafluoride plasma to provide an undercut. After removing the resist, a wet chemical etchant may be used to provide the cavities 52, 54 and undercut regions 56, 58 with a V-shape or U-shape. The wet chemical etchant may exhibit selectivity with respect to crystal orientation of the semiconductor material of the semiconductor substrate 16 and may be characterized by different etching rates along different crystalline directions, which produces the V-shape or U-shape. For example, the wet chemical etchant may be a solution containing tetramethylammonium hydroxide.

The calibration markers 44 may be visible in an image acquired by a metrology tool 55 as high contrast objects that are recognizable. The calibration markers 44 may be used to calibrate the metrology tool 55. The calibration of the metrology tool 55 may enable accurate and repeatable measurements of a dimension of a photonics structure of the photonics chip. The metrology tool 55 may include an imager configured to acquire an image of a portion of a photonics chip. The metrology tool 55 may also include a computer configured with a processor and software with instructions executable on the processor to operate the imager to acquire the image and to analyze the acquired image.

The metrology tool 55 may scan back and forth, as diagrammatically shown by reference numeral 53, along a photonics chip in operation with a field-of-view, as diagrammatically shown by reference numeral 57, and may acquire images within the field-of-view 57 while scanning. The metrology tool 55 may use pattern recognition to find a photonic structure, such as the cavity 52 or the edge coupler 26 proximate to the cavity 52, in an image. The calibration marker 44 associated with the photonic structure may also be visible in the image acquired by the metrology tool 55. The metrology tool 55 may determine one or more dimensions, in units of pixels, of the imaged features 46, 48, 50 of the calibration marker 44. The imaged features 46, 48, 50 of the calibration marker 44 have fixed known linear dimensions D1, D2, D3 in, for example, microns that permits the metrology tool 55 to calculate a pixel-to-linear dimension conversion factor. The pixel-to-linear dimension conversion factor is then used to convert a number of pixels, for example, for a dimension of the photonic structure to a linear dimension. For example, the metrology tool may determine the width W and/or length L of the cavity 52 using the pixel-to-linear dimension conversion factor. The larger size of the feature 50, in comparison to the adjacent features 46, 48, and the arrangement of the features 46, 48, 50 may also permit the orientation of the calibration marker 44 and/or the photonic structure to be determined from the analyzed image.

Figure 6:
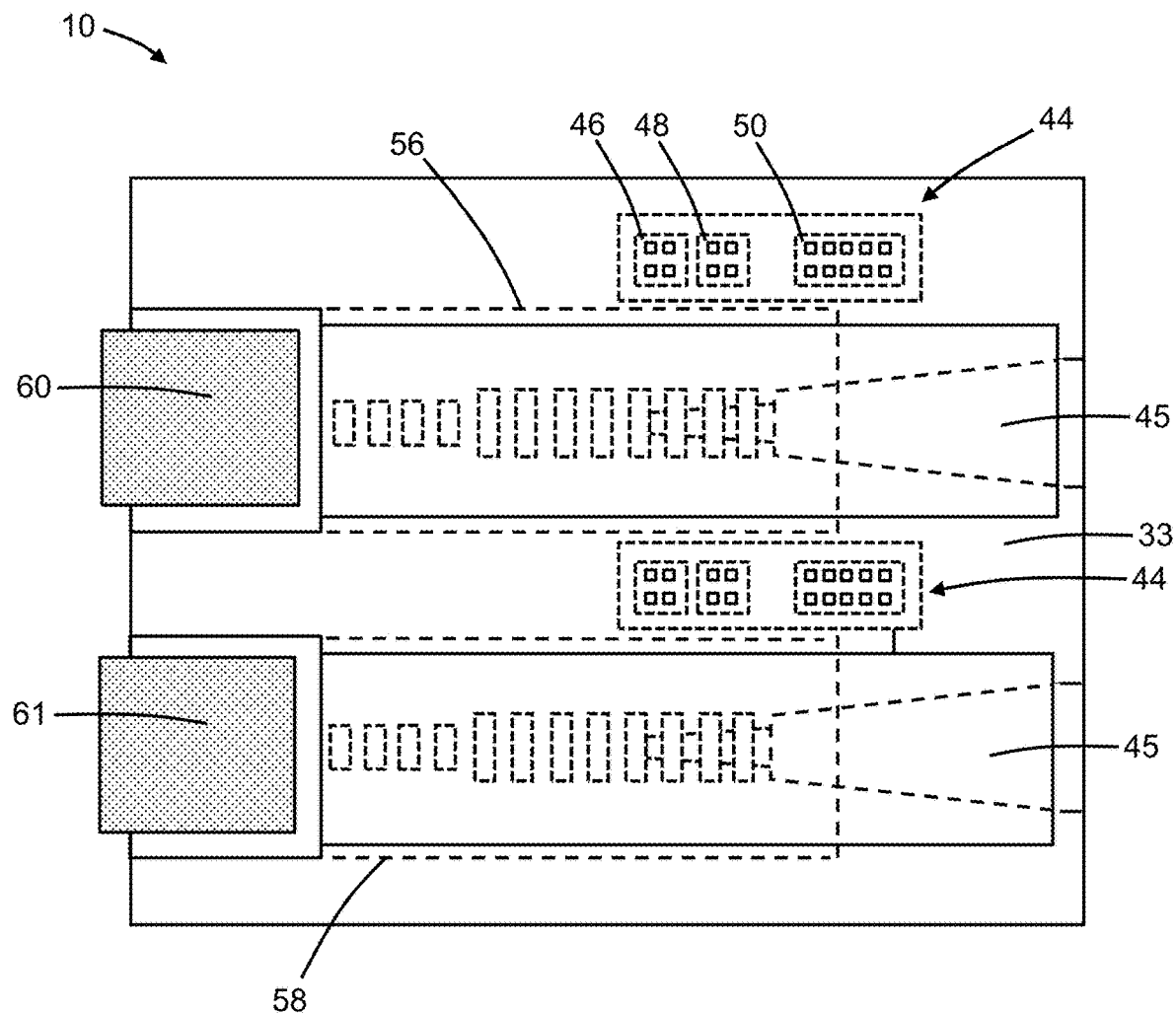
FIG. 6 is a top view of the structure at a fabrication stage of the processing method subsequent to FIGS. 5, 5A.

With reference to FIG. 6 in which like reference numerals refer to like features in FIGS. 5, 5A and at a subsequent fabrication stage, a light source 60 may be positioned in the cavity 52 adjacent to the edge coupler 26, and a light source 61 may be positioned in the cavity 54 adjacent to the edge coupler 27. The light source 60 may be configured to provide light (e.g., laser light) in a mode propagation direction toward the edge coupler 26, and the light source 61 may be configured to provide light (e.g., laser light) in a mode propagation direction toward the edge coupler 27. The edge couplers 26, 27 may be configured for coupling light from the light sources 60, 61 to a photonic integrated circuit on the photonics chip. The light may be characterized by a given wavelength, intensity, mode shape, and mode size, and the edge couplers 26, 27 may provide spot-size conversion for the light. The space between the edge couplers 26, 27 and the light sources 60, 61 may be filled by air or by an index-matching material, such as an optical adhesive. In an embodiment, the light sources 60, 61 may be optical fibers, and the cavities 52, 54 may be open-ended grooves configured to receive respective tips of the optical fibers.

Figure 7:
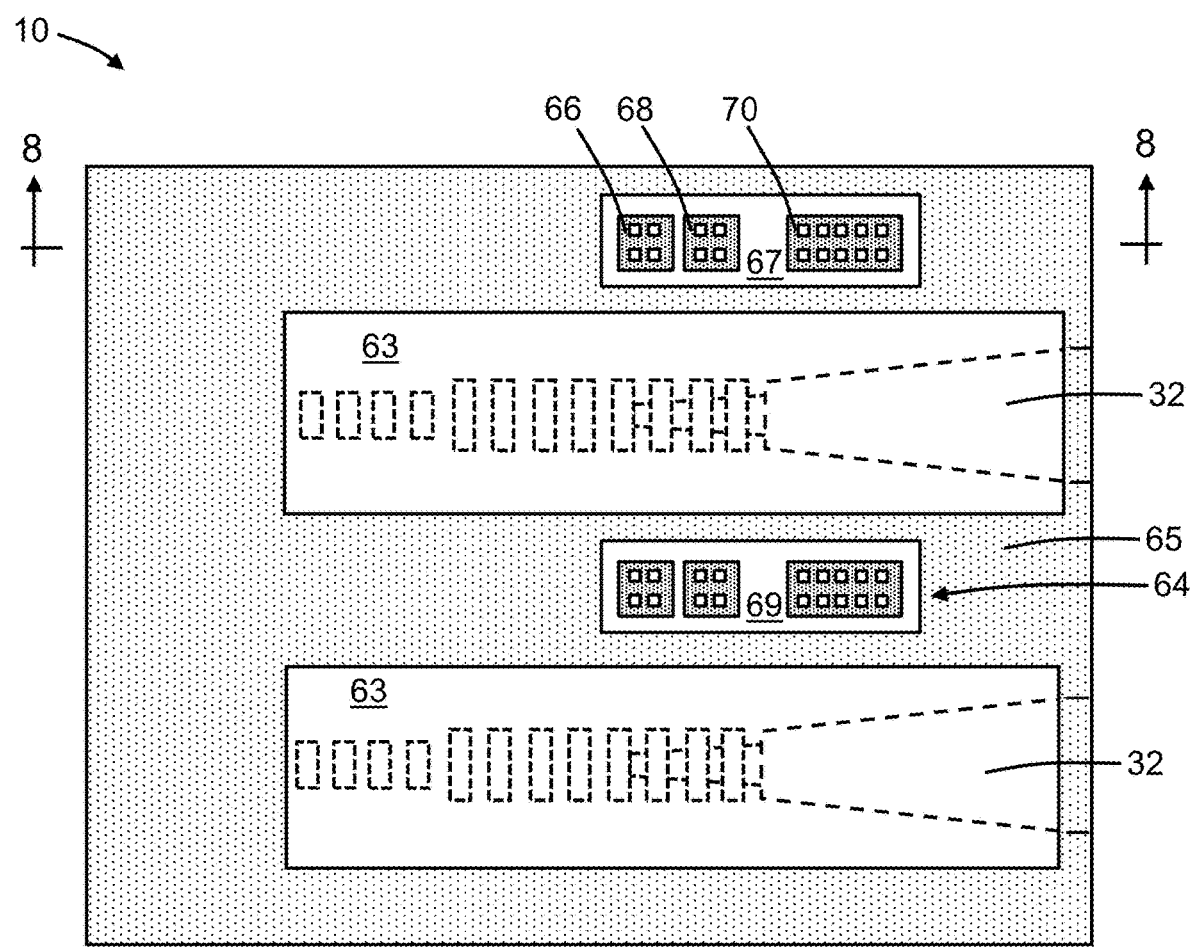
FIG. 7 is a top view of a structure in accordance with alternative embodiments of the invention.
Figure 8:
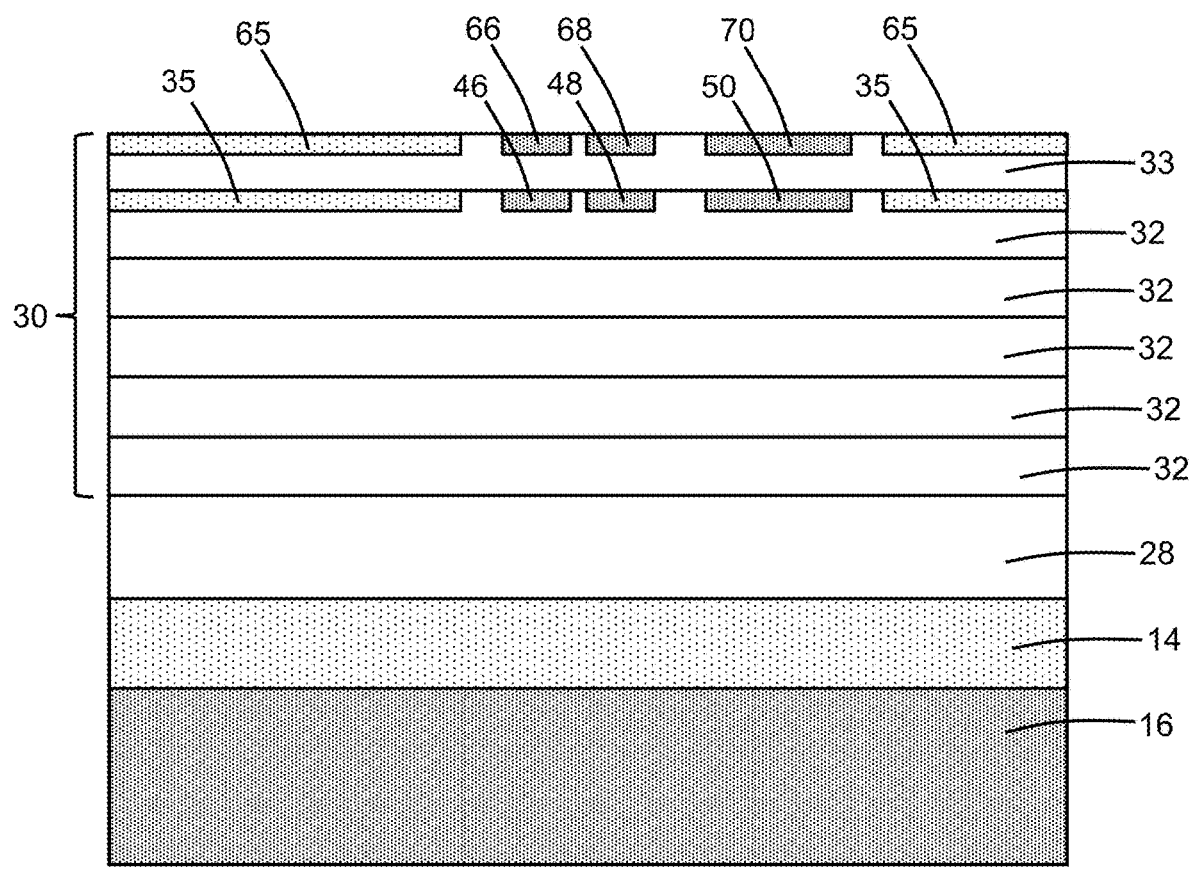
FIG. 8 is a cross-sectional view taken generally along line 8-8 in FIG. 7.

With reference to FIGS. 7, 8 and in accordance with alternative embodiments, a set of calibration markers 64 may be formed in the interlayer dielectric layer 33 over the calibration markers 44. In an embodiment, the calibration markers 64 may include a set of features 66, 68, 70 that are identical or substantially identical in size and arrangement to the features 46, 48, 50 of the calibration markers 44. In an embodiment, the features 66 of the calibration markers 64 may respectively overlap with the features 46 of the calibration markers 44, the features 68 of the calibration markers 64 may respectively overlap with the features 48 of the calibration markers 44, and the features 70 of the calibration markers 64 may respectively overlap with the features 50 of the calibration markers 44. The calibration markers 64 are disposed in exclusion areas 67, 69 of a fill region 65 that is similar to the fill region 35. The fill region 62 may also include exclusion areas 63 that overlap with the edge couplers 26, 27 and the exclusion areas 36, 38. The overlap between the calibration markers 44 and the calibration markers 64 may improve the ability to calibrate the metrology tool by reinforcing their contrast in an image acquired by the metrology tool.

Figure 9:
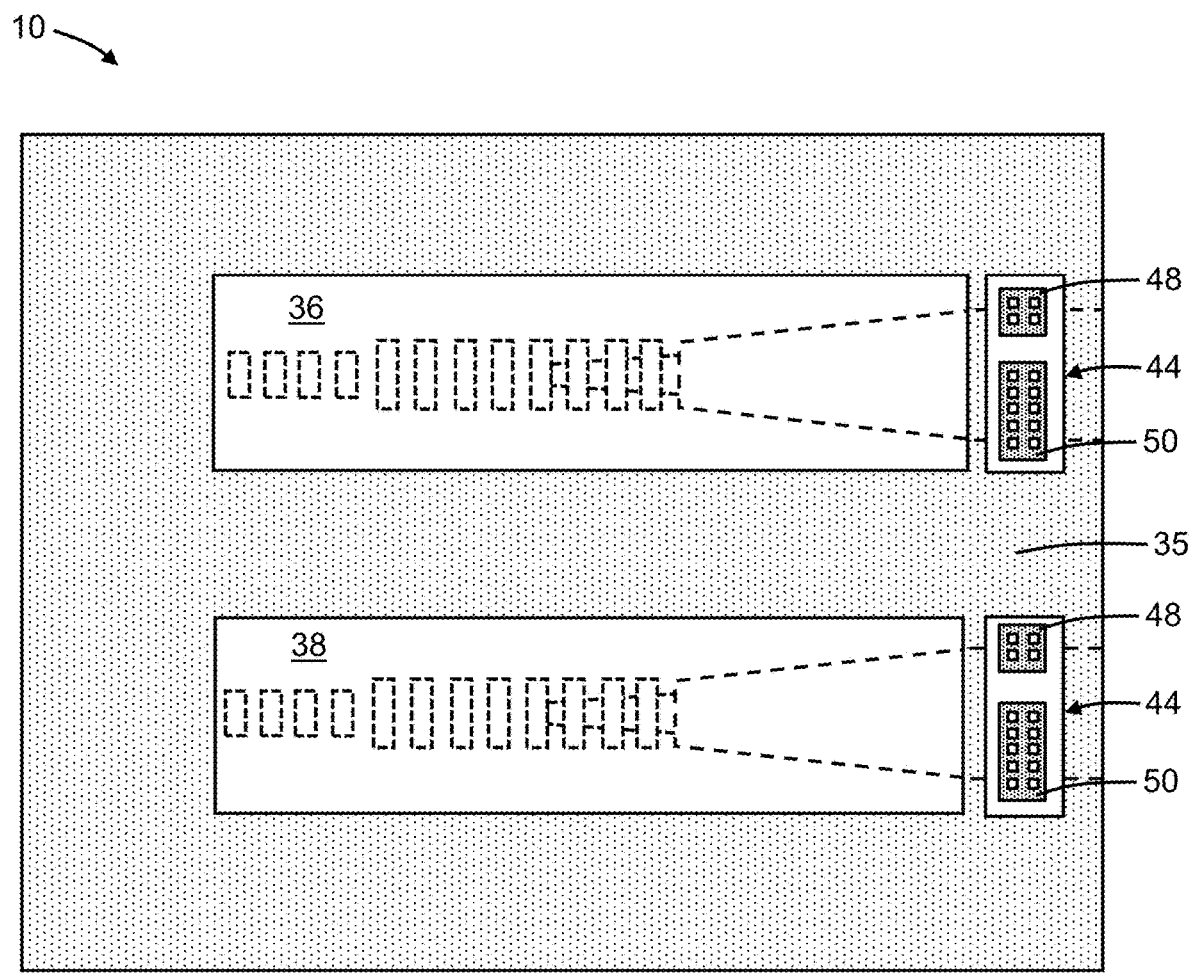
FIG. 9 is a top view of a structure in accordance with alternative embodiments of the invention.

With reference to FIG. 9 and in accordance with alternative embodiments, the calibration markers 44 may be moved to positions adjacent to the ends 19 of the edge couplers 26, 27. Specifically, one of the calibration markers 44 is disposed adjacent to the end 19 of the edge coupler 26, and another of the calibration markers 44 is disposed adjacent to the end 19 of the edge coupler 27. In an embodiment, each calibration marker 44 may include the features 48, 50 and omit the feature 46. In an embodiment, the edge coupler 26 may be fully disposed between the associated calibration marker 44 and the light source 60, and the edge coupler 27 may be fully disposed between the associated calibration marker 44 and the light source 61.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a semiconductor substrate;
   a photonic structure; and
   a back-end-of-line stack over the semiconductor substrate, the back-end-of-line stack including a first plurality of fill features, a first exclusion area surrounded by the first plurality of fill features, and a first calibration marker in the first exclusion area, the first calibration marker adjacent to the photonic structure, the first calibration marker including a first feature and a second feature adjacent to the first feature, the first feature and the second feature disposed in a row, the first feature having a first predetermined dimension, the second feature has a second predetermined dimension, and the first predetermined dimension of the first feature is larger than the second predetermined dimension of the second feature.

2. The structure of claim 1 wherein the back-end-of-line stack includes a second exclusion area surrounded by the first plurality of fill features and a second calibration marker in the second exclusion area, and the second calibration marker includes a third feature having a third predetermined dimension.

3. The structure of claim 2 wherein the photonic structure is disposed between the first calibration marker and the second calibration marker.

4. The structure of claim 1 wherein the photonic structure is an edge coupler on the semiconductor substrate.

5. The structure of claim 4 wherein the edge coupler has a side, and the first calibration marker is disposed adjacent to the side of the edge coupler.

6. The structure of claim 4 wherein the edge coupler has a first end, and the first calibration marker is disposed adjacent to the first end of the edge coupler.

7. The structure of claim 6 wherein the edge coupler has a second end, and further comprising:
   a light source disposed adjacent to the second end of the edge coupler.

8. The structure of claim 7 wherein the light source is an optical fiber.

9. The structure of claim 1 wherein the photonic structure is a groove in the semiconductor substrate.

10. The structure of claim 1 wherein the first plurality of fill features comprise a first metal, and the first feature of the first calibration marker comprises a second metal that is the same as the first metal.

11. The structure of claim 1 wherein the back-end-of-line stack includes a second plurality of fill features over the first plurality of fill features, a second exclusion area surrounded by the second plurality of fill features, and a second calibration marker in the second exclusion area, the second calibration marker includes a feature having a third predetermined dimension, and the feature of the second calibration marker overlaps with the first feature of the first calibration marker.

12. The structure of claim 11 wherein the third predetermined dimension is substantially equal to the first predetermined dimension.

13. The structure of claim 1 wherein the first exclusion area is fully surrounded by the first plurality of fill features, and the first plurality of fill features are absent inside the first exclusion area.

14. The structure of claim 1 wherein the first calibration marker is configured to calibrate a metrology tool used to measure a dimension of the photonic structure.

15. A method comprising:
forming a back-end-of-line stack over a semiconductor substrate, wherein the back-end-of-line stack includes a plurality of fill features, an exclusion area surrounded by the plurality of fill features, and a calibration marker in the exclusion area, the calibration marker is adjacent to a photonic structure, the calibration marker includes a first feature and a second feature adjacent to the first feature, the first feature and the second feature are disposed in a row, the first feature has a first predetermined dimension, the second feature has a second predetermined dimension, and the first predetermined dimension of the first feature is larger than the second predetermined dimension of the second feature.

16. The structure of claim 4 wherein the back-end-of-line stack includes a second exclusion area surrounded by the first plurality of fill features, the second exclusion area overlaps with the edge coupler, and the second exclusion area is laterally spaced from the first exclusion area.

17. A structure comprising:
a semiconductor substrate;
an edge coupler on the semiconductor substrate; and
a back-end-of-line stack over the semiconductor substrate, the back-end-of-line stack including a plurality of fill features, an first exclusion area surrounded by the plurality of fill features, and a calibration marker in the first exclusion area, the calibration marker adjacent to the edge coupler, and the calibration marker including a first feature having a first predetermined dimension,
wherein the back-end-of-line stack includes a second exclusion area surrounded by the plurality of fill features, the second exclusion area overlaps with the edge coupler, and the second exclusion area is laterally spaced from the first exclusion area.

18. The structure of claim 17 wherein the calibration marker includes a second feature adjacent to the first feature, and the second feature has a second predetermined dimension.

19. The structure of claim 18 wherein the first feature and the second feature are disposed in a row.

20. The structure of claim 19 wherein the first predetermined dimension of the first feature is larger than the second predetermined dimension of the second feature.

* * * * *